(12) United States Patent
Middleton

(10) Patent No.: US 7,170,496 B2
(45) Date of Patent: Jan. 30, 2007

(54) ZERO-FRONT-FOOTPRINT COMPACT INPUT SYSTEM

(76) Inventor: Bruce Peter Middleton, 808-1483 Lamey's Mill Road, Vancouver, BC (CA) V6H 3Y7

( * ) Notice: Subject to any disclaimer, the term of this patent is extended or adjusted under 35 U.S.C. 154(b) by 530 days.

(21) Appl. No.: 10/765,307

(22) Filed: Jan. 26, 2004

(65) Prior Publication Data

US 2004/0155870 A1    Aug. 12, 2004

Related U.S. Application Data

(60) Provisional application No. 60/523,393, filed on Nov. 19, 2003, provisional application No. 60/442,327, filed on Jan. 24, 2003.

(51) Int. Cl.
*G09G 5/00* (2006.01)

(52) U.S. Cl. ........................ 345/169; 345/168; 345/173

(58) Field of Classification Search ........ 345/156–175; 341/22; 379/93.18, 93.19; 400/485, 486
See application file for complete search history.

(56) References Cited

U.S. PATENT DOCUMENTS

| | | | |
|---|---|---|---|
| 3,967,273 | A | 6/1976 | Knowlton |
| 4,139,837 | A | 2/1979 | Liljenwall et al. |
| 5,521,986 | A | 5/1996 | Curtin et al. |
| 5,528,235 | A | 6/1996 | Lin |
| 5,543,588 | A | 8/1996 | Bissett et al. |
| 5,901,222 | A | 5/1999 | Macor |
| 5,973,621 | A | 10/1999 | Levy |
| 5,982,303 | A | 11/1999 | Smith |
| 6,256,029 | B1 | 7/2001 | Millington |
| 2002/0136371 | A1 | 9/2002 | Bozorgui-Nesbat |
| 2002/0136372 | A1 | 9/2002 | Bozorgui-Nesbat |
| 2004/0263479 | A1* | 12/2004 | Shkolnikov ................. 345/169 |
| 2005/0140659 | A1* | 6/2005 | Hohl et al. ................. 345/169 |
| 2006/0001649 | A1* | 1/2006 | Rekimoto ................... 345/169 |

* cited by examiner

*Primary Examiner*—Richard Hjerpe
*Assistant Examiner*—Mansour M. Said

(57) ABSTRACT

An input system for compact devices such as cell phones and watches which includes alphanumeric and pointer capability, provides input rates similar to those of optimized-stylus-keyboard and thumboard systems, and is one-hand operable and compatible with full-face displays. Input is by means of an "eyes-free" pointing device (which may be a touchpad with tactile markings, an isometric sensor or an array of discrete keys) which may be mounted on the back of the unit. An optionally-displayed menu of input options embodies a gestural code: the action needed to select a symbol on the menu is the required gesture—even when the menu is not shown. Cursor control is through an absolute positional function; this permits experienced users to type by touch, relying on kinesthetic cues. The user may maintain contact with the sensor during transits between selections, in which case visual feedback (in the form of a cursor, highlighting of indicated menu features, and/or a stroke trace) is provided—which enables pre-emptive correction of errors, and quick learning. The user indicates selection with a modulation of contact pressure. Two gestural lexicons are described. One uses pointing gestures and a flat menu, and is simpler; the other uses stroke gestures and a cellular menu, and is more space-efficient.

20 Claims, 2 Drawing Sheets

| a b c | d e f | g h i |
| j k l | m n o | p q r |
| s t u | v w x | y z ! |
| 1 2 3 | Hm ↑ Pu | ∧ ¢ ° |
|  | ← ¶ → | ☐ _ ☐ |
| 7 8 9 | En ↓ Pd | ☐ ☐ \| |
| 0 # % | ( Ins ) | & $ ? |
| + / * | \ Tab @ | : ' " |
| Esc - = | Bs Sp Dl | ; , . |

| a b c<br>j k l<br>s t u | d e f<br>m n o<br>v w x | g h i<br>p q r<br>y z ! |
|---|---|---|
| 1 2 3<br><br>7 8 9 | Hm ↑ Pu<br>← ¶ →<br>En ↓ Pd | ^ ¢ °<br>□ _ □<br>□ □ \| |
| 0 # %<br>+ / *<br>Esc - = | ( Ins )<br>\ Tab @<br>Bs Sp Dl | & $ ?<br>: ' "<br>; , . |

ZERO-FRONT-FOOTPRINT COMPACT INPUT SYSTEM

CROSS-REFERENCE TO RELATED APPLICATIONS

This application is entitled to the benefit of Provisional Patent Application Ser No. 60/442,327 filed Jan. 24, 2003 and Provisional Patent Application filed Nov. 19, 2003, 60/523,393.

FIELD OF THE INVENTION

This invention concerns input systems with alphanumeric capacity, which are compact enough for use on handheld and wearable devices, and more specifically such systems whose use does not occlude the front surface of the device.

BACKGROUND OF THE INVENTION

Compact Input: The State of the Art

The emergence of portable information tools such as cell phones and handheld computers has created a need for extremely compact alphanumeric input systems which are nonetheless quick and convenient to use. The systems developed fall mostly fall into three categories: character-recognition systems, binary key arrays, and permutative systems.

Character-recognition systems have the benefit of exploiting pre-existing handwriting skills. However, they are intrinsically inefficient, because the inscription of characters is an inefficient form of data input. Analyzed as a trajectory, the average letter has five critical points, each of which is an independent vector; thus inscription of a character is as physically complex as a sequence of five idealized keystrokes. As a result, handwriting speeds are about half as fast as the other systems considered here. Although once prominent in the form of Palm Computing's Graffiti™, their popularity has recently waned as people have come to appreciate that thumboards are faster and easier to use.

Binary key arrays can permit very high input rates for expert users, even in compact forms actuated by a stylus (most notably Fitaly™, from Textware Solutions, which uses a proprietary layout optimized for single-entry-point efficiency) or two thumbs (as popularized by the Blackberry™ from Research In Motion, which exploits the familiarity of the QWERTY layout). Indeed, contest results posted at the www.Fitaly.com website show speeds in excess of sixty words per minute for both of these systems. However, stylus-based systems involve the inconvenience of extracting the stylus and require two hands or a desktop, and thumboards are too large for contemporary phones. A recent thumboard—that of the Treo™ 600 (originally from Handspring Corporation and now from palmOne, Inc.)—refines the thumboard scrupulously, and achieves a width of 53 mm and a form factor which permits one-handed use. Even so, it cannot fit on contemporary cell phones. Some other recent innovations aim to sidestep the finger-width on constraint keyboard size. Levy (U.S. Pat. No. 5,973,621) uses disambiguation of multi-key strikes to permit sub-finger-width spacing. Another approach is to use fewer keys, but give each several functions; Lin et al [U.S. Pat. No. 5,528,235], for example, use five-way keys in a phone keypad. A third approach—offered on most cell phones at present and thus the most widespread binary-key solution—is dictionary-based software disambiguation, most prominently T9™ from Tegic Corporation. It provides moderately fast input for skilled users entering text, but has several drawbacks—including the cognitive noise of the system's fluctuating guesses, the need to learn an arbitrary code (the assignment of letters to numeral keys), and the need to shift to some other system for dictionary-defying data such as numbers, names and Internet addresses.

Permutative systems use codes which associate sequences of input signals with generands. For alphanumeric capacity, pair codes are sufficient. The most lucid form is what may be termed the "cellular menu": an array of cells is displayed, each containing an array of symbols. A first directional signal selects a cell, and a second selects a symbol within the cell: a pair code is implicit in the menu. An early example is Knowlton (U.S. Pat. No. 3,967,273 1976), who describes a telephone keyboard where each button is labeled with symbols representing its neighborhood; the keyboard itself functions as a cellular menu. Millington (U.S. Pat. No. 6,256,029 2000) and Bozorgui-Nesbat (pending U.S. application 20020136371) are more recent examples. These systems, however, involve two or three taps to generate a single character, which makes them uncompetitive in speed.

An improvement is possible by using strokes across a target matrix; this fuses a pair of taps into a single fluid gesture. Furthermore, the continuity of strokes provides a natural way of transmitting a gesture-termination or parsing signal: a break in contact signals gesture completion. Liljenwall et al (U.S. Pat. No. 4,139,837 1979) and Curtin et al (U.S. Pat. No. 5,521,986 1996) both describe systems of this sort, using the end points of traced trajectories as paired vector signals. Both, however, rely on unpromising mnemonic systems based on the graphical features of characters.

A system which combines stroke gestures with a cellular menu—and then adds an efficiency-optimized layout—is described in a second pending application (#20020136372) of Bozorgui-Nesbat, and implemented in his program MessagEase™ (Exideas Inc.). It has joined Fitaly and the Treo thumboard in achieving speeds of more than sixty words per minute in the Fitaly contest; together, these three systems define the current state of the art. It is possible to foresee at least two improvements which lie ahead for them: a clamshell handset with a thumboard will keep its weight securely within the user's hand and eliminate competition for surface area between display and keyboard; and a system which combines the efficiency of Fitaly's layout with the convenience and intrinsic speed of the Treo's thumboard should be able to push the limits still further.

To summarize, several systems have shown that breakthrough performance is possible in a PDA form factor—but none of these have been successfully implemented even on the cell phones of today, with their small displays and relatively capacious front decks.

Demands of the Future

For portable devices, progress brings two compelling imperatives into collision: devices shrink, and displays expand. The scope of PDA screens increases constantly, and has now passed the VGA threshold; phones are on the same track, though a couple of years behind. As the volume required for core functionality continues to shrink, the limiting factors which prevent phones from becoming the true personal computers increasingly become display size and intolerable input systems. The full-face display is inevitable—once people are trying to read documents, watch video and browse the Internet on their phones every square centimetre of display becomes precious. A related development is the computer watch—compellingly convenient, if it ever becomes easier to use than paper.

This is the logjam the current invention addresses: shattering some assumptions which keep input from fitting wherever it is needed. First, however, some prior art on a few related topics may be mentioned:

Tentative Selection Display
Cziernecki (U.S. Pat. No. 5,917,476 Cursor feedback text input method 1999) describes a system which uses a touch tablet as an unmarked keyboard: touching the tablet causes a character corresponding to the point of contact to be displayed, changing as the point of contact is changed; release of contact finalizes selection.
Millington also provides tentative selection display, although at the cost of an added confirmation keystroke.

Input Via Non-Translational Analog Input Device
Smith (U.S. Pat. No. 5,982,203 1999) describes a permutative system marketed as Thumbscript, which uses angled trajectories. Although the marketed version has an array of binary sensors, Smith mentions use of a joystick as input device.
Macor (U.S. Pat. No. 5,901,222 1999) describes a telephone handset with a trackball or joystick in which all input is effected by activating virtual function keys.

Bottom-Mounted Sensor
Bissett et al (U.S. Pat. No. 5,543,588) describe a handheld computer using a bottom-mounted touchpad. This is however a purely hardware innovation, and does not touch on data entry.

SUMMARY OF THE INVENTION

The practise of invention may be seen as the identification of false assumptions implicit in current practise, whose correction creates new freedom. The current invention aims to correct two false assumptions about input systems: that they need to be in a visible location so that the execution of input gestures may be visually supervised, and that keys make sense.

One basic objective is to migrate the actuable elements of the input system away from the front surface of the device, so that the display can occupy the whole of that surface and be unobscured during use—without sacrificing the input rates, one-handed convenience and novice usability of the best current systems. This is possible because electronic technology makes it possible to monitor the input process more effectively than with direct visual supervision, by exploiting the very display whose growth is being enabled. A menu of input options—which provides all the benefits of a keyboard legend, and goes further in that it is never obscured by actuating digits, can be suppressed when not needed to permit more working display and can be reconfigured instantly to accurately show the options available in different modes—includes a live representation of the input signal the user is generating. To enable this display, a new gestural style is adopted: transits are made while maintaining light normal pressure, and the sensor must be capable of distinguishing this from a firmer pressure exerted during gestures.

The second innovation is to decouple and redistribute various functions traditionally conflated in the concept of a "key". A key is at once an actuable element, a target, a visual feature, a tactile feature and (through its inscription) a menu element. The menu display shifts two of these functions away from the input-sensing system; the others also are better separated—which is made possible by using a single pointing device as the only primary input sensor. If keys are not used, clearances are no longer needed; finger width is eliminated as a parameter, and gestures may be optimally scaled to suit the precision with which humans can generate vectors. This reduces action, which will tend to increase speed and reduce stress and injury the actuable elements may be placed anywhere. For a handset, it is possible to utilize the most dextrous digits—index finger and thumb— and to place the actualle elements within their natural range of motion while the handset is securely and comfortably gripped.

There are two implementations. One is a modified form of binary key array: targets correspond directly to generands, and are selected by simple pointing gestures. The other is a stroke-gesture, cellular-menu system.

In the pointing-gesture system, the actuable element is a small touchpad, the targets are identifiable locations on the touchpad, and tactile features are a few ridges which suffice to identify targets and to establish continuous awareness of finger location. Scale of motion becomes arbitrary, and is reduced from the finger-width spacing of keyboards to the size of handwriting strokes—established over centuries as an optimal compromise between physical effort and the effort of concentration. The resulting system fits easily on the back of a phone, in the natural range of motion of the index finger. With the addition of a thumb-operable mode key on the side of the handset, an ample supply of signals— and other useful modes, such as a pointer mode and a panning mode (important for small devices)—are just a nudge away. (Such a mode key has an advantage over standard shift keys, even on desktop keyboards, in that it is a parallel signal, generated by an otherwise-free digit.)

The cellular-menu/stroke-gesture system is implemented in both touchpad and isometric forms. The touchpad form is much like the binary-key-array implementation, but with a reduced scale of motion which may appeal to expert users. It uses the same hardware, so the user can be invited to toggle between the forms and perhaps migrate to the cellular form as skill develops. The isometric form eliminates finger motion altogether; as with notebook pointing devices, the choice between these two may be a matter of personal taste.

A watch implementation requires the extreme compactness of the cellular-menu form. It locates both the primary sensor and the shift key, not on the body of the watch, but on the strap buckle, which is more convenient for the other hand to access. This buckle may be stabilized by a secure grip between thumb and middle finger, with the signal threshold of the shift key set high enough to ignore the gripping force.

OBJECTS OF THE INVENTION

The objects of the invention are to provide an input system which:
is compact enough for use on pocketable devices such as cell phones and wearable devices such as watches;
permits data entry by the hand holding the unit for handheld devices;
uses gestures which are physically and cognitively simple, so that expert users can achieve high input rates;
is instantly usable by novices;
permits "eyes-free" operation by intermediate and expert users;
permits the working display of the apparatus to cover its entire front surface;

offers the output range of a full keyboard and a pointing-device;

is cheap enough to be included as an interface device for any appliance or equipment which can benefit from character input or flexible control.

DETAILED DESCRIPTION OF THE PREFERRED EMBODIMENTS

Figures 1, 2:
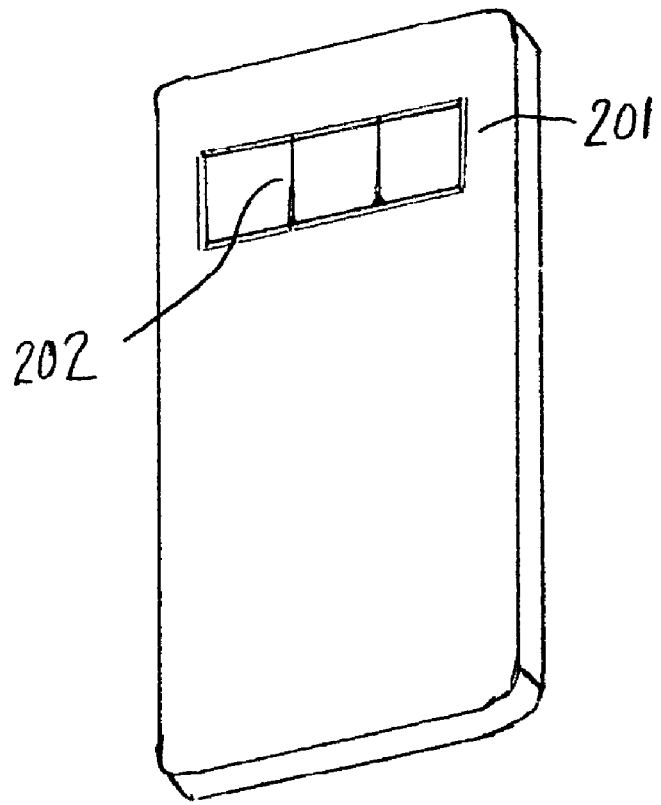
FIG. 1 shows a possible menu with letters in alphabetic order.
FIG. 2 is a perspective view of a handset bearing a touchpad divided into three cells by tactile ridges

FIG. 1: Gesture-to-generand Mapping

FIG. 1 shows a cellular menu, which expresses a gesture-to-generand mapping. The choice of a mapping is not momentous if the system supports easy remapping. The technology provides a bonus here: the traditional inscribed keyboard serves as a chart which is virtually impossible to amend—but onscreen displays are perfectly malleable. They can show shift-mode generands when shift modes are in effect, and they can switch to different mappings as instantly and effortlessly as the interpretive system can. Plausibly desirable mappings include QWERTY on centre row and optimized single-entry-point mappings. FIG. 1 shows another alternative: an alphabetic mapping. Fortuitously, three of the most common letters—a, e, and i—receive single-target, "jab" gestures (as does the most common character of all, the space). As a result, the average vector count per character is 1.6, rather than 2. (Note that "□" denotes an unassigned gesture).

An alphabetic mapping may suit casual users: they need to find symbols on the menu as part of the input process, so an arrangement which makes this easy will be efficient for them. There is much room for debate on mappings. For example, highly efficient and organized mappings are possible if shift states are regarded as without penalty, and used freely: with separate tiers for numerals and math operators, symbols, and cursor/machine control, prime spots would be freed for letters. Fortunately, with no lock-in effect, it is possible for example to offer both a mapping optimized for reflex expert use and one optimized for menu-guided casual use as standard equipment, with users selecting one or the other with a tap to begin a session; and users can be given the ability to modify and define mappings. A legacy mode which assigns jabs to numerals may also be provided on phones. Foreign-language users, for example, will be free to download and swap menus and mappings as freely as they currently download ringtones; internationalization will be a solved problem.

To elaborate on the gestural system: there are four elements to a gesture—cell indication, confirmation (cell selection), symbol indication and confirmation (symbol selection). However, the gestural lexicon permits all four of these signals to be fused into a single stroke. Modulation of the planar components of the input variable effects navigation (and thus target indication), while modulation of the normal component effects selection. The user transits to the desired cell (with transited cells showing "indicated" highlighting as the cursor passes through them) while maintaining light normal pressure, confirms selection by increasing pressure above a value which serves as the threshold of the gesture range (at which point the highlighting of the selected cell changes to a form which means "selected"), and maintains pressure in the gesture range while selecting a symbol within the cell (with symbols similarly being highlighted as the cursor comes into their zones). In this second phase the scaling factor between input signal and cursor movement is reduced: fine motion on screen is produced without requiring finer input. Finally, reduction of normal pressure below the threshold value serves to confirm symbol selection; this terminates the gesture, and leaves the user ready to transit to the next cell target.

Gestural System and Notation

The gestural system divides the space of vectors generable by the pointing device into a meaningful zone (or gesture zone) subdivided into (preferably) nine target zones, and a non-meaningful (or transit) zone. In the preferred implementation, in which the Z variable is force, the transit zone is the region in which Z force is less than some meaningfulness threshold value $Z_g$: a uniform layer. Below this is the gesture zone. In the simplest case (where the second meaningful vector is planar location of termination point), this is divided into target zones by four lines which resemble a tic-tac-toe board and show positive and negative threshold values of X and Y components of the planar variable ($F_x = \pm L_g$, $F_y = \pm L_g$). Every gesture traces a trajectory through this vector space; the gesture begins when the trajectory passes through the threshold plane into the gesture zone, and ends when the trajectory passes back into the transit zone. For the touchpad implementation, strokes are real strokes through space; for the isometric implementation they are "force-strokes" through force-space.

Target zones may be identified by numeral in the pattern seen on a telephone keypad (1–3 on top, 4–6 as middle row, 7–9 on the bottom). A gesture is then specified by identifying the defining or critical points of a trajectory: 6, 15 and 2946 are possible gestures. In some cases intermediate zones will necessarily be crossed, but because they lie on the defined trajectory they are insignificant and are not mentioned: 123 is not a valid gesture, though in an extended gestural system which allowed for dwell time as a significant variable it might be.

"Jab" gestures are those in which only a single target zone is traversed. 3, for example, is the gesture for "i", and 8 is the gesture for the space character. They may be interpreted as ordered pairs which repeat a single element. "Drag" gestures are those in which the trajectory passes through at least two target zones before returning to the transit zone. Thus 13 is the gesture for "c", and 49 is the gesture for "9". There are nine jabs and 72 simple drags: 81 single-stroke gestures. In distinguishing jabs from drags (for example, the cursor move 53 from the "e" gesture 3), the criterion is when $Z_g$ is initiated: if before the pointing vector crosses out of the home target zone, the gesture is a drag; if after, it is a jab.

An example of a possible extended-gesture application is the treatment of the F1–F12 functions: they could be generated by spelling out their names ("f1" etc.) without releasing $Z_g$ between characters. Although complex compared to other signals, the resulting trajectories are in the range of single inscribed characters: the longest have six critical points, while a capital "B" has eight.

As examples of possible extended gestural lexicons: an emphatic font (capital, bold, or italic, at the user's choice) might be indicated by tracing a character stroke with Z force greater than some threshold value $Z_2$, well above normal levels; accents might be added by extending the stroke for a character with a gesture which draws the accent, executed above $Z_2$ before the gesture is terminated. Going further, it is easy to provide programmability—permitting users to define their own gestures or their own gestural lexicons. Some possible uses: users could define the signature of their initials as a gesture (preferably with temporal sensitivity), then use it as a password which they will not forget, and which others cannot crack; and users familiar with Braille, shorthand or other symbolic systems would be free to develop mnemonically-resonant implementations of them, without being constrained by a gestural lexicon chosen for other purposes.

Figure 3:
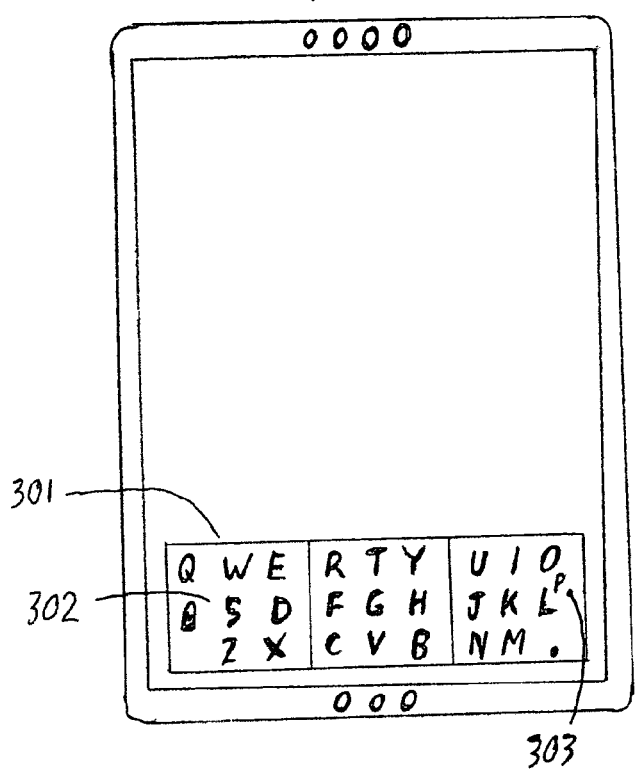
FIG. 3 is a front view of the handset of FIG. 3 with menu displayed

FIGS. 2 and 3 show the pointing-gesture implementation, which uses an elongated touchpad 201 bearing tactile markings 202 which serve to identify a set of targets serving as effective keys. A suitable arrangement is a touchpad 30 mm wide, with tactile ridges serving to define three 10 mm squares. Each of nine zones within each square may serve as a key. (These zones are: 4 corners—fingertip firmly contacting two ridges; 4 sides—fingertip contacting one ridge—and centre—fingertip not firmly contacting any ridges. Both humans and touchpads have ample sensory resolution to distinguish these forms of actuation.). The mapping may follow qwerty convention, as shown by menu 301; mappings designed to optimize efficiency of single-digit input (such as the Fitaly and Opti keyboards) may also be used, as may an alphabetic ordering. The user may be given all of these options, and also the option of defining custom mappings. If a QWERTY layout is to be fit into nine columns, the tenth column may be accommodated by stroke gestures—a left-and-down stroke form the right-hand edge being a natural "Enter" gesture, while a straight-left gesture from the right edge makes sense for the backspace. P is the orphan—303 shows a possible assignment, with the downward stroke from O being used for P. Given that there is only one anomaly, people will learn it quickly.

Feedback

If there are multiple meaningful levels of normal force (or if it is desired to educate users about extravagant force levels, which are a well-documented ergonomic problem with keyboards), the feedback display can show the magnitude of the normal force, and threshold values for meaningful levels. This can be achieved in various ways without going beyond the idea of highlighting; for example, the background of an indicated cell or symbol can have a color which expresses normal force, either continuously or with abrupt changes at threshold values.

Better still is a live display of the input signal itself—shown as a trace across the menu, which serves as a map of input space. Learning is further facilitated by the fact that the system shows tentative selection of screen objects (both cells, in cellular systems, and symbols): input errors may be detected and corrected at each stage without generating output errors, and indication becomes selection only when a second signal is received.

In FIG. 3, a trace 302 is shown which reveals the trajectory through input space since the last selection. Analog feedback must suit the gestural lexicon used. If strokes are defined by two locations, direct display of the trajectory suffices. However, if strokes are defined by initial target zone and direction what matters at each moment is not the absolute location of the contact point, but its displacement D (in input space) from the initial point of contact; the significant facts are the octant in which the direction of this vector lies, and whether its magnitude is greater than a noise threshold. A suitable system would draw a trace of the gesture, starting out at the centre of the contacted cell at initial contact. As in the minimal display option, the tentatively-selected symbol at each moment should be highlighted. Octant boundaries (and the circle around the cell centre which shows the noise threshold) could be shown, but are perhaps obvious enough in the jumps of the highlight from symbol to symbol as the cursor migrates.

Z-force may be represented by line width, and if so the gesture threshold can be shown as a pair of faint lines bracketing the trajectory. Color may also be used—for example, the trace can be green for transit range, yellow for recommended gesture range, red for excessive down-force.

Fortunately computer technology makes it possible to provide excellent visual feedback on gesture execution—better actually than direct sight of the gesturing digit—even though the operation is taking place in an occluded location. With an onscreen menu and an appropriate mapping rule, it is possible to give the user a live and precise display of the signal they are generating, in a context which also identifies the signals required to elicit generands and shows any difference between them. The user truly does see what they are doing—although they do not see themselves doing it.

Tentative Selection Display at Cursor

To encourage the user who is not quite certain of a gesture assignment to try out his or her best guess, the system can be programmed to display, at the cursor position, the symbol associated with any gesture after the gesture has been held for, say, half a second. (The pause prevents the visual noise of flashing symbols during normal input.) The user may then be given the options of releasing (which terminates the gesture and confirms the selection);

aborting the selection by executing a scrub gesture (for example, a rapidly-reversed horizontal stroke);

trying out other second targets by changing the signal vector;

eliciting menu display by a executing a menu gesture (for example, a rapidly-reversed vertical stroke).

This will be useful at an intermediate stage where the user knows the common characters and has varying degrees of certainty about others. Hunches can be painlessly tested if such feedback is provided; if not, guessing at associations will be inhibited and reliance on the menu will be extended.

Figure 4:
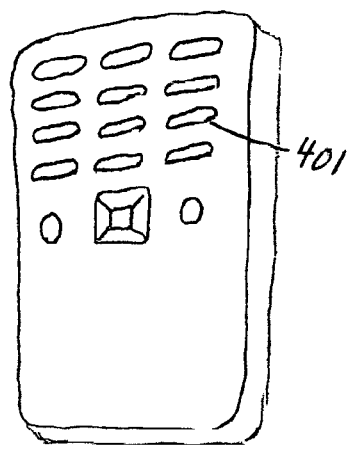
FIG. 4 is a perspective view of a handset bearing an array of discrete keys.

FIG. 4 shows a hybrid system, with a set of keys similar to a conventional phone keypad. As on some phones, these keys 401 are wider than they are tall—about 10 mm wide and 4 mm tall. Each key may then be taken as offering three targets in an alphabetic mode: left edge, centre and right edge. If each key is mounted on two strain gauges separated laterally, pressure applied in each of these target regions will produce a distinctive pattern of strains. The alphabet may be mapped onto three rows of keys substantially in accordance with qwerty convention, or the alphabetic assignment used on phones may be adopted. The generands normally occupying the tenth column of a qwerty keyboard (comprising "P", Backspace and Enter) may be assigned to keys on the fourth row, or to stroke gestures (since strokes across keys are distinguishable). This system is clearly less versatile than a touchpad and is not recommended, but is suggested as a possibly attractive intermediate form for some customers who might find an abrupt move to a keyless system too radical.

Figure 5:
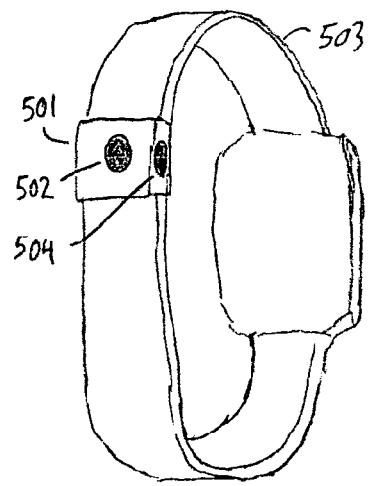
FIG. 5 is a perspective view of a watch showing primary sensor and shift key mounted on the watchstrap buckle.

FIG. 5 shows a watch with strap 503, bearing isometric sensor 502 on the face of buckle 501. Shift key 504 is located on a side of buckle 501; the buckle might be made reversible to accommodate right- and left-handed users. A small touchpad would also fit, at least on a man's watchstrap, but the pointing-gesture system cannot be accommodated. Applications such as this may justify the cellular-menu form, and once users have mastered it they may find it attractive even for devices which could fit a pointing-gesture sensor.

Other Envisioned Applications

An option particularly relevant to women's watches, in which the need for display width clashes with a desire for a slender form, is to put the display on the inside of the bracelet, with the text orientation perpendicular to the axis of the arm. The sensor can then be on the back of the wrist, finger-operable, with a thumb-operable shift key on the side of the wrist. The display in this case will not be tall enough to show the menu all at once—but a viable system is possible. A display 8 mm tall can display two lines in a comfortable 9-point font, and three lines in 6-point (commonly used for "the fine print"). This scope can provide a partial option display, in a 3×3 matrix menu occupying one end of the display. Before a cell has been selected, the menu can show a 3×3 matrix representing the nine cells, with the jab generand for each displayed (one highlighted) and cell borders shown (like a tic-tac-toe board); initiation of $Z_g$ selects a cell and brings up its symbol menu. To indicate where in the larger array the active cell is located, thick borders can be drawn around the cell on those sides which border neighboring cells: each cell has a unique set of such borders. To revoke a reconsidered cell selection, $L_2$ can be used to push the cursor through a border; the menu then shows the symbols from the newly-selected cell. With diagonal pushes included, two will get you to any cell.

Such a reduced-display system can even be effected using a single character. In this case, the initial display can show a skeletal representation of the menu, with double lines for outer walls and single lines for inner walls; cell indication can still be shown by highlighting the indicated cell. Upon selection, the jab generand is shown, surrounded by walls on all sides—with the lines dashed for those walls not adjacent to the symbol. The pattern of single and double lines identifies the cell, while the pattern of adjacencies identifies symbol position. Using $L_2$ jabs for cell jumps and permitting wrapping between cells and within cells, two jabs are enough to get anywhere in the matrix—so it's not hard to browse. Such diminutive displays might be used on tiny devices such as pen pagers or on very low-cost and possibly disposable items such as tickets.

A camera can put all controls on the force key, with a device-control mode. The range of gestures available permits camera operation to be simplified and enriched: for example, instead of requiring the user to select a shooting mode with a separate control and then redeploy the camera to shoot, lateral nudges on the force key can cause unit movements of a cursor across a set of mode symbols at the bottom of the rangefinder image while vertical force controls zoom and a firm inward push triggers capture. In advanced systems the user might toggle into a mode in which the force key controls a cross-hair cursor, moving over the rangefinder image to designate a focusing target. The system can support multiple modes: for example a simple mode which offers only the controls so far described and minimizes the potential for error, and a more responsive advanced mode in which shooting-mode selection and zooming are effected by radial gestures with Z-force held below $Z_g$ (gestures which would be transit strokes in text mode) while jabs and drags can issue other commands (for example specifying aperture, exposure time and metering mode). At any time the user can toggle out of device-control mode to use various applications in which the force key follows normal character-input/cursor-control conventions—for example navigating and editing the portfolio of shots, fluently generating comments to be attached to images, and accessing the manual. Some commands within the device-control mode will be analog, but some may also incorporate characters generated by momentary reversions to character-input mode. There is no reason to require a two-hand grasp of the device: the palm and three lower fingers can maintain a firm grip on the body while an index finger effects all control through the force key. One benefit of such simplicity is that the apparatus can fully accommodate left-handed users (which is seldom attempted at present)—even providing a second force key in a position convenient for left-handed use if necessary, at little cost.

An aftermarket version for existing handsets can attach a sensor to the lower surface, with a cable or infrared link to the system such as aftermarket keyboards use at present. The sensor may be attached with adhesives, or by use of a mechanical clamping fixture (the "sleds" which provide card slots for PDAs at present being one model); in the latter case the shift key can easily be accommodated on the side of the unit.

Other uses extend to every sort of product which can benefit from character input or flexible control. For devices such as camcorders which intrinsically have displays, the addition of a sensor makes it possible to provide a manual on a ROM chip; such a manual can never be lost, is always there when needed and can be searched instantly with one hand.

The invention claimed is:

1. An input system for a compact electronic device comprising a primary sensor and associated interpretive and display-control circuitry, wherein:
   a) the sensor is actuable by a digit of a user and registers values of a planar variable, associated with the digit and modulable by the user, in an x dimension and a y dimension; and also registers values of a normal variable, associated with the digit and modulable by the user, in a z dimension normal to a plane of contact between the sensor and the digit; whereby the set of possible momentary input signals forms a three-dimensional vector region or input space, and the signal registered over an interval of time is a trajectory through this region;
   b) the interpretive circuitry is configured to:
      i) distinguish at least two meaningful ranges of the normal variable, detect transitions between said two ranges, and interpret such transitions in at least one direction as gesture termination signals;
      ii) distinguish multiple target zones within the input space, and test for indication value on a substantially continuous basis, where indication value expresses whether any target zone is indicated and if so which, where a target is indicated if the contemporaneous input value lies within it;
      iii) upon detection of a change in indication value, register the new value and transmit it to the display-control circuitry;

iv) maintain a mapping identifying assignments of possible generands to target zones;

v) upon detection of gesture termination, consult the registered indication value to determine whether any target zone is indicated, and if so consult the mapping to determine whether any generand is associated with the indicated target zone, and if so generate it;

c) the display-control circuitry is configured to:

i) generate an image which includes a menu comprising an array of menu features;

ii) maintain a list of associations between particular ones of said menu features and particular ones of said target zones;

iii) upon receipt of a signal expressing a change in indication value, modify the image in a manner which visually identifies any menu feature associated with an indicated target zone as indicated, and visually identifies all other menu features as not indicated;

whereby tentative selection display is established, and the user is provided with continuous feedback during transits.

2. An input system according to claim 1 which is more specifically a stroke-sensing system, wherein:

a) the normal variable is force, and the interpretive circuitry is configured to:

i) identify trajectory segments as gestures in accordance with a parsing rule which distinguishes two meaningful ranges of normal force, one of which is a gesture range and the other of which is a transit range, such that the input space is divided into an gesture zone and a transit zone, and defines entry into the gesture zone as gesture initiation and exit from the gesture zone as gesture termination; whereby gestures are trajectory segments which begin at a point of entry into the gesture zone, remain continuously within the gesture zone, and end at a point of exit from the gesture zone;

ii) determine selection values for members of a set of menu features and members of a set of possible output signals or generands in accordance with a lexical rule which identifies meaningful features of a gesture and associates code elements with them and a mapping which assigns output values to possible sets of code elements, wherein:

the lexical rule defines a set of target zones in input space and associates code elements with them;

the interpretive circuitry registers the input signal on a substantially continuous basis, and if on any cycle the input signal lies within a target zone and:

(a) the normal variable is in the transit range, registers the code element associated with the target zone as indicated;

(b) gesture initiation is detected, registers the code element associated with the target zone as selected;

and in either case transmits a signal expressing the registered selection value to the display-control circuitry; and the lexical rule further specifies a set of second-element criteria each of which returns a value of true or false when applied to an incomplete gesture and associates a code element with each of these criteria;

the interpretive circuitry applies the second-element criteria on a substantially continuous basis as a gesture is executed and in the event of a true result registers the code element associated with the fulfilled criterion as indicated and applies the mapping; and if the mapping returns a generand, registers the generand as indicated and transmits a corresponding signal to the display control circuitry; and iii) upon detection of gesture termination, determine whether a generand is indicated, and if so generate the generand;

b) the display-control circuitry is configured to:

i) generate an image which includes a menu comprising an array of symbols, each of which represents a generand, organized into an array of cells, wherein the cells of the array correspond to possible first code elements and thereby correspond also to target zones, and each symbol is located in the cell associated with the first code element of the pair associated with the generand which the symbol represents;

ii) upon receipt of a signal identifing a first code element as indicated, modify the image in a manner which identifies the associated cell as indicated;

iii) upon receipt of a signal identifying a first code element as selected, modify the image in a manner which identifies the associated cell as selected;

iv) upon receipt of a signal identifying a generand as indicated, modify the image in a manner which identifies the symbol which represents the generand as indicated.

3. An input system according to claim 1 wherein the sensor is mounted to a non-frontal surface of the device, whereby a display which covers substantially all of the frontal surface of the device and which remains unoccluded by the user's hand during use of the device may be provided.

4. An input system according to claim 1 wherein said display-control circuitry is further configured to enable or disable menu display responsive to the value of a user-adjustable setting, whereby display of the menu is made optional and may be toggled on and off by the user.

5. An input system according to claim 1 wherein the sensor is an isometric force-transducing sensor and the planar variable is force.

6. An input system according to claim 1 wherein the sensor is a touchpad and the planar variable is location and the touchpad has tactile features sufficient to generate continuous user awareness of location, whereby the user may reliably execute intended gestures without visual supervision of the actuating digit.

7. An input system according to claim 6 wherein the normal variable is a binary variable whose possible values are contact and non-contact and the gesture-termination signal is termination of contact.

8. An input system according to claim 1 wherein the normal variable is force and each of said meaningful ranges has appreciable depth, whereby the gesture termination signal is a reduction in normal force below a threshold.

9. An input system according to claim 1 wherein the sensor is an array of discrete keys and the planar variable is location.

10. An input system according to claim 9 wherein the array includes a conventional twelve-key telephone keypad.

11. An input system according to claim 9 wherein the array includes at least one multivalent key which is actuable in a plurality of modes.

12. An input system according to claim 2 in which at least one meaningful gesture has more than two critical points and is associated with a set of code elements which has more than two members.

13. An input system according to claim 1 including logic means which support user-definable mappings, whereby for example gesture remapping and the addition of macros which generate character strings in response to single gestures are made possible.

14. An input system according to claim 1 including logic means which support user-definable lexical rules, whereby for example increased angular resolution, multiple meaningful ranges of vector magnitude, or extended gestures may be implemented.

15. An input system according to claim 1 wherein the sensor is an analog sensor with respect to the planar variable and the system has a cursor-control mode.

16. An input system according to claim 1 with an analog-feedback mode in which a trace representing an input trajectory being contemporaneously generated by the user is displayed on the menu.

17. An input system according to claim 1 wherein a secondary sensor or shift key is provided and is operable by a second digit of the user and serves at least to selectively invoke any of a set of modes including at least a capital-letter mode.

18. An input system according to claim 17 wherein the compact device is a handheld device and the primary sensor is positioned on a back surface of the device and is operable by an index finger of a hand holding the device and the shift key is positioned on a lateral surface of the device and is operable by a thumb of the hand holding the device.

19. An input system according to claim 17 wherein the compact device is a wristwatch with an attached band bearing a buckle and the primary sensor is mounted on an outer surface of the buckle and is operable by an index finger of the user and the shift key is mounted on a lateral surface of the buckle and is operable by a thumb of the user.

20. A stroke-gesture input system for a compact electronic device comprising a sensor capable of registering a three-dimensional input signal generated by a digit of a user and associated interpretive and display-control circuitry, wherein:

a) the input signal at any moment comprises a value of a planar variable having x and y components and a normal force in a z dimension normal to the plane of contact between the sensor and the digit; whereby the set of possible momentary input signals forms a three-dimensional vector region or input space and the signal registered over an interval of time is a trajectory through this region;

b) the interpretive circuitry is configured to:

i) identify trajectory segments as gestures in accordance with a parsing rule which distinguishes two meaningful ranges of the normal force, one of which is a gesture range and the other of which is a transit range, such that the input space is divided into a gesture zone and a transit zone, and defines entry into the gesture zone as gesture initiation and exit from the gesture zone as gesture termination; whereby gestures are trajectory segments which begin at a point of entry into the gesture zone, remain continuously within the gesture zone, and end at a point of exit from the gesture zone;

ii) associate possible output signals or generands with gestures in accordance with a rule which identifies a set of criteria which return values when applied to a gesture and defines a mapping between possible sets of these values and generands;

c) the display-control circuitry is configured to:

i) generate an image which includes a menu comprising an array of menu features;

ii) upon receipt of a signal identifying a menu feature as indicated, modify the image in a manner which identifies the menu feature as indicated.

* * * * *